United States Patent [19]

Murphy

[11] Patent Number: 4,958,252

[45] Date of Patent: Sep. 18, 1990

[54] CIRCUIT BREAKER WITH RATING PLUG HAVING MEMORY

[75] Inventor: William J. Murphy, Monroeville, Pa.

[73] Assignee: Westinghouse Electric Corp., Pittsburgh, Pa.

[21] Appl. No.: 465,663

[22] Filed: Jan. 16, 1990

[51] Int. Cl.$^5$ ............................................... H02H 3/08
[52] U.S. Cl. ........................................ 361/93; 361/87; 364/483
[58] Field of Search ............................ 361/87, 93, 96; 364/483

[56] References Cited

U.S. PATENT DOCUMENTS

| | | | |
|---|---|---|---|
| 4,351,013 | 9/1982 | Matsko et al. | 361/96 |
| 4,809,125 | 2/1989 | Matsko et al. | 361/93 |
| 4,870,531 | 9/1989 | Danek | 361/93 |

Primary Examiner—Derek S. Jennings
Attorney, Agent, or Firm—M. J. Moran

[57] ABSTRACT

A microprocessor based circuit breaker has a removable rating plug which provides a reference for the current rating of the breaker. The removable rating plug also has an EEPROM to which the microcomputer of the circuit breaker writes for storage, the number of operations of the circuit breaker operating mechanism and a trip history of the breaker in the form of a count of the number of trips weighted by the magnitude of the trip current. The rating plug is periodically removed and plugged into a portable programmer which selectively displays the number of operations and operating history of the circuit breaker. The programmer clears this operating data when recorded and can write into the EEPROM the style and serial number of the circuit breaker with which the rating plug is to be used.

15 Claims, 4 Drawing Sheets

CIRCUIT BREAKER WITH RATING PLUG HAVING MEMORY

BACKGROUND OF INVENTION

1. Field of the Invention

This invention relates to circuit breakers with replaceable rating plugs for selectively setting the current at which the circuit breaker trips, and in particular to a microprocessor based circuit breaker with a rating plug which also contains a memory device which records operating data generated by the microprocessor for retrieval by a portable reader when the rating plug is removed from the circuit breaker.

2. Background Information

Circuit breakers are widely used to protect electrical lines and equipment. The circuit breaker monitors current through an electrical conductor and trips to interrupt the current if certain criteria are met. One such criterion is the maximum continuous current permitted in the protected circuit The maximum continuous current that the circuit. breaker is designed to carry is known as the frame rating However, the breaker can be used to protect circuits in which the maximum continuous current is less than the circuit breaker frame rating, in which case the circuit breaker is configured to trip if the current exceeds the maximum continuous current established for the particular circuit in which it is used This is known as the circuit breaker current rating. Obviously, the circuit breaker current rating can be less than but can not exceed the frame rating.

Typically, the circuit breaker current rating is set by a rating resistor which is selected to generate a preset voltage when a current proportional to the maximum continuous current permitted in the protected circuit passes through the rating resistor. In order to provide for adjustment of the current rating so that the circuit breaker can be used to protect circuits with different maximum continuous currents, it is known to incorporate the rating resistor in a replaceable rating plug which may be selectively inserted into the breaker. An example of a circuit breaker with such a replaceable rating plug is disclosed in U.S. Pat. No. 3,826,951.

While circuit breakers have traditionally been electromechanical analog devices, recently circuit breakers have been developed which incorporate a microprocessor to implement the trip logic. An example of such a microprocessor based circuit breaker is disclosed in U.S. Pat. No. 4,351,013. That circuit breaker includes a replaceable rating plug with a resistor selected to provide a reference for the maximum continuous current established for the protected circuit.

Circuit breakers are subject to mechanical wear and electrical damage which determine the service life of the device. It is desirable to know how much useful life remains on a circuit breaker so that the circuit breaker can be replaced before it fails, but yet is not removed prematurely. It is known to attach a mechanical counter to a circuit breaker operating mechanism to record the cycles of operation. While this provides a measure related to the mechanical wear on the circuit breaker, it does not provide an assessment of electrical damage to the circuit breaker. The current interrupted by the circuit breaker can greatly exceed the maximum continuous current under fault conditions. While the circuit breaker will typically be able to operate many times at currents up to, and even slightly above, the maximum continuous current, it probably will only be able to be operated a few times at high fault currents and perhaps even only once in interrupting very high fault currents that could be experienced in a particular installation Accordingly, there is a need for a circuit breaker which provides a quantitative measure of service life remaining.

There is also a need for such a circuit breaker in which the quantitative measure of service life remaining is readily available and easily extracted.

There is a particular need for such capabilities in a microprocessor based circuit breaker and further in such a microprocessor based circuit breaker having a replaceable rating plug.

There is an additional need for such a circuit breaker which provides a quantitative measure of the remaining life of the circuit breaker which takes into account the magnitudes of the current interrupted as well as the number of cycles of the operating mechanism.

SUMMARY OF THE INVENTION

These and other needs are satisfied by the invention which is directed to a circuit breaker in which a microcomputer in the trip device monitors current in an electrical circuit protected by the circuit breaker and trips the operating mechanism of the circuit breaker when the current exceeds a selectable current level. The microcomputer of the trip device also generates service data on the breaker including the number of operations of the operating mechanism and a cumulative count of the number of trips weighted by a function of the current interrupted by each trip. This service data is written into a non-volatile memory, such as an erasible electrically programmable read only memory (EEPROM), which is carried in a removable rating plug.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

The invention will be described as applied to a three-phase microprocessor based, molded case circuit breaker 1 shown schematically in FIG. 1. Such a circuit breaker 1 is described in detail for instance in U.S. Pat. No. 4,351,013. It will be appreciated, however, that the invention is applicable to other microprocessor based circuit breakers.

Figure 1:
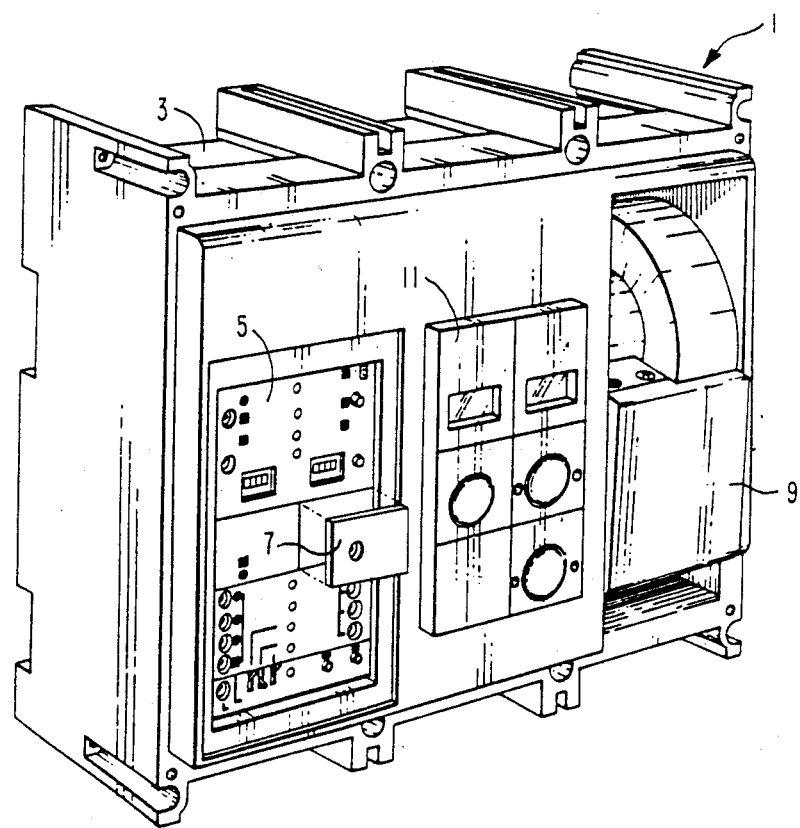
FIG. 1 is an isometric view of a circuit breaker incorporating the invention.

As shown in FIG. 1, the circuit breaker 1 includes a molded case housing 3. A trip unit 5 monitors the current flowing through the conductors of an electrical circuit to which the circuit breaker is connected (see FIG. 2) and actuates a trip mechanism to open the circuit if predetermined current parameters are exceeded One of those parameters is the maximum continuous current, or rated current, of the circuit breaker. The rated current is set by a rating plug 7 which is removably insertable into the front the trip unit 5. The circuit breaker 1 also includes a handle 9 by which an operator can operate the trip mechanism and manual controls 11.

Figure 2:
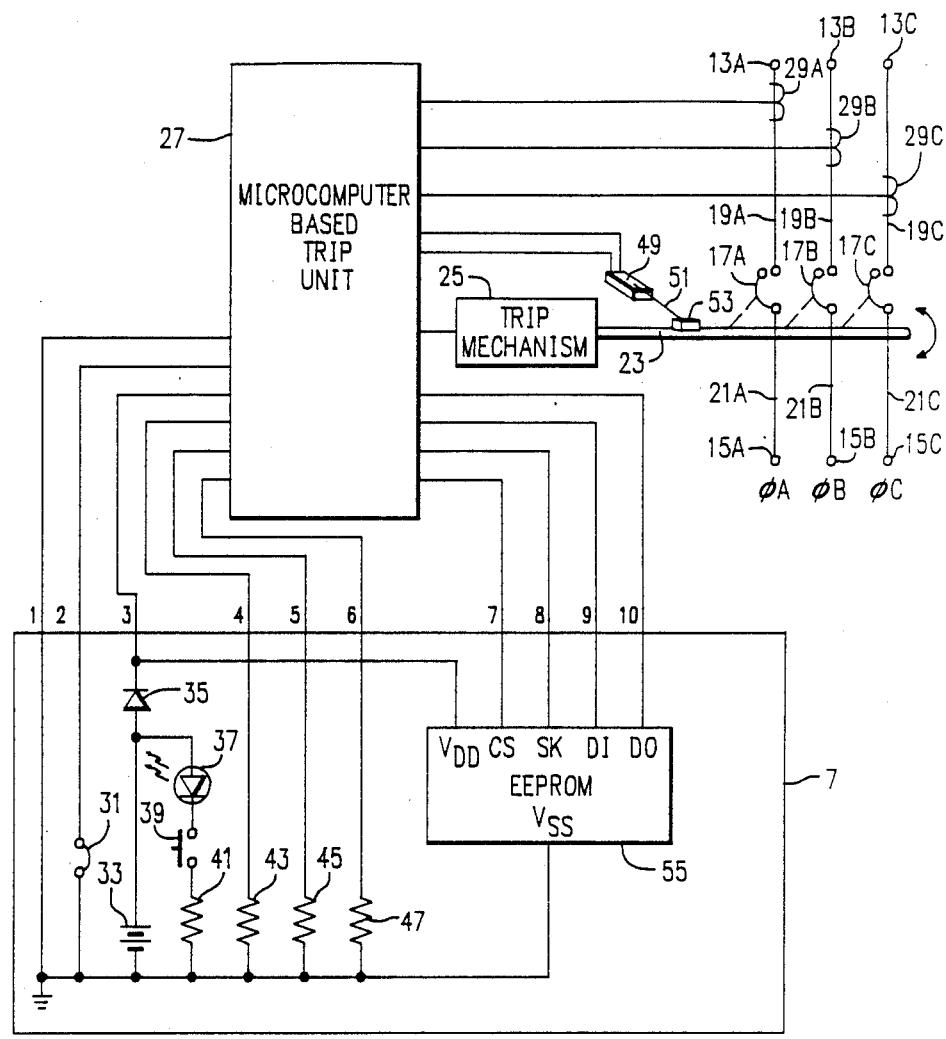
FIG. 2 is a schematic circuit diagram of the circuit breaker of FIG. 1.

As shown in FIG. 2, the circuit breaker includes line terminals 13A, 13B and 13C for connection to a three-phase source of ac power (not shown) and corresponding load terminals 15A, 15B and 15C. The circuit breaker 1 also includes a set of contacts 17A, 17B and 17C for each phase connected to the line terminals by leads 19A, 19B and 19C and connected to the load terminals by the conductors 21A, 21B and 21C. The contacts 17A, 17B and 17C are operated by a trip bar 23 which in turn is operated by a trip mechanism 25. The trip mechanism is controlled by a microcomputer based trip unit 27 The microcomputer based trip unit 27 monitors the phase currents through the current monitors 29A, 29B and 29C respectively, and is programmed as discussed in U.S. Pat. No. 4,351,013, to implement predetermined time versus current tripping characteristics which result in actuation of the trip mechanism 25 which opens the contacts 17A, 17B and 17C.

The time versus current trip characteristics are, in part, a function of the maximum continuous current permitted by the circuit breaker. This maximum continuous current is also called the current rating of the circuit breaker. As long as the current remains below this maximum continuous current rating, the breaker will remain closed. Momentary low magnitude excursions above the rated current are tolerated; however, persistent overcurrents result in tripping of the breaker. The time delay and generation of the trip signal is an inverse function of the magnitude of the current. For very large magnitude overcurrents, such as would be produced by a fault, the microcomputer is programmed to generate a trip signal instantaneously.

The rated current for the circuit breaker 1 is determined by the installation in which the circuit breaker is used. As previously mentioned, a circuit breaker is designed to maintain a certain level of current, known as the frame rating, continuously. However, a circuit breaker can be used in installations having a range of maximum continuous currents up to the frame rating of the breaker. The maximum continuous current for the particular application, is the current rating. In the circuit breaker of U.S. Pat. No. 4,351,013, this current rating is set by the replaceable rating plug 7. As shown in FIG. 2, the rating plug 7 has ten pins which connect the rating plug with the microcomputer based trip unit 27. The pin 1 is a common ground. Pin 2 connects a removable jumper 31 which if present indicates that the circuit breaker is connected in a 60 Hz installation, and if absent, identifies a 50 Hz installation. The removable rating plug 7 also is provided with a battery 33 protected with a blocking diode 35 which is connected with the microcomputer based trip unit 27 through pin 3. This battery 33 provides power to LED indicators (not shown) controlled by the microcomputer based trip unit 27 when the circuit breaker is tripped. This battery 33 is necessary in an installation where the circuit breaker is powered by the protected circuit, and thus, where power is lost when the circuit breaker is tripped. An LED 37 in the rating plug 7 provides an indication of the condition of the battery when the test button 39 is depressed. A resistor 41 limits the current through the LED 37.

The rating plug 7 also includes 3 precision resistors 43, 45 and 47, which are connected to the common ground and through pins 4, 5 and 6, respectively, to the microcomputer based trip unit 27. The resistor 43 provides a reference for the microcomputer for the frame rating of the circuit breaker The resistor 45 establishes the current rating of the circuit breaker by providing a reference to the microcomputer for the maximum continuous current. The value of this resistor is selectable to set the desired current rating. The resistor 47 is a calibration resistor for the microcomputer based trip unit 27.

The components of the rating plug described to this point are provided in the rating plug used in the circuit breaker of U.S. Pat. No 4,351,031.

The life of the circuit breaker 1 is dependent upon the number of mechanical operations, i.e., the opening and closing of the contacts 17A, 17B and 17C. Such mechanical operations include not only trips, but opening and closing of the breaker with normal currents below the rated current, as well as, operations of the breaker when no current is flowing through the contacts. Wear on the circuit breaker 1 also depends upon the magnitudes of the currents which are interrupted. Interruption of currents of sizable magnitude results in arcing across the contacts. While circuit breakers include means to reduce the effects of this arcing, it still results in some deterioration of the contacts. Interruptions of very large fault currents can make the contacts unserviceable after only a few interruptions or even one very large interruption.

It is desirable to have a quantitative measure of the wear on the circuit breaker, so that the circuit breaker can be removed from service before failure. At the same, it is desirable to obtain get maximum service from the breaker. In accordance with the invention, the microprocessor based trip unit 27 is programmed to count the number of operations of the operating mechanism and also to maintain a count of the number of times current is interrupted weighted as a function of the magnitude of the currents interrupted. These two counts provide a quantitative measure of the use of the circuit breaker and correspondingly of the service life remaining. The microcomputer based trip unit 27 can compute the number of trips and calculate the weighted count as a function of the magnitude of the current interrupted from information generated by the microcomputer in generating the trip signal. In order to count the number of mechanical operations of the operating mechanism, the microcomputer based trip unit 27 receives a signal from a micro switch 49 having a actuating arm 51 which is operated by a cam 53 on the trip bar 23 of the circuit breaker.

The service life information generated by the microcomputer based trip unit 27 is transmitted to a nonvolatile memory 55 provided in the rating plug 7. This nonvolatile memory 55 takes the form of an erasible electrically programmable read only memory (EEPROM). The EEPROM 55 is powered through the input $V_{DD}$ and is connected to the common ground through input $V_{SS}$. The EEPROM 55 also has a chip select input CS, a serial clock input SK, a data in terminal DI through which the EEPROM receives data from the microcomputer, and a data output terminal, $D_O$ through which data in the EEPROM is read by the microcomputer. The CS, SK, DI, and DO terminals are connected to the microcomputer through pins, 7, 8, 9, and 10, respectively, of the rating plug 7.

Figure 3:
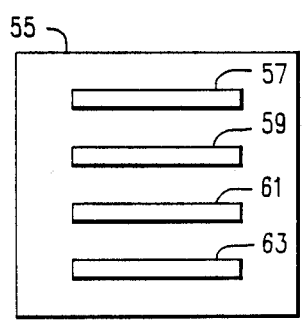
FIG. 3 is a diagram of the memory map of a memory device used in the circuit breaker of FIGS. 1 and 2.

FIG. 3 illustrates a map of the memory of the EEPROM in which the service data on the circuit breaker is stored. The EEPROM memory includes four registers storing service data on the circuit breaker. The first register 57 records the style or model of the circuit breaker. The second register 59 records the serial number of the breaker. Register 61 records the trip history of the circuit breaker which is the number of trips weighted by a function of the current interrupted by each trip. Finally, the register 63 records the number of operations of the operating mechanism of the circuit breaker. The trip history and the number of the operations of the operating mechanism are written into the registers 61 and 63 by the microcomputer. The style or model number and the serial number in registers 57 and 59 is entered by a separate device to be discussed.

Figure 4:
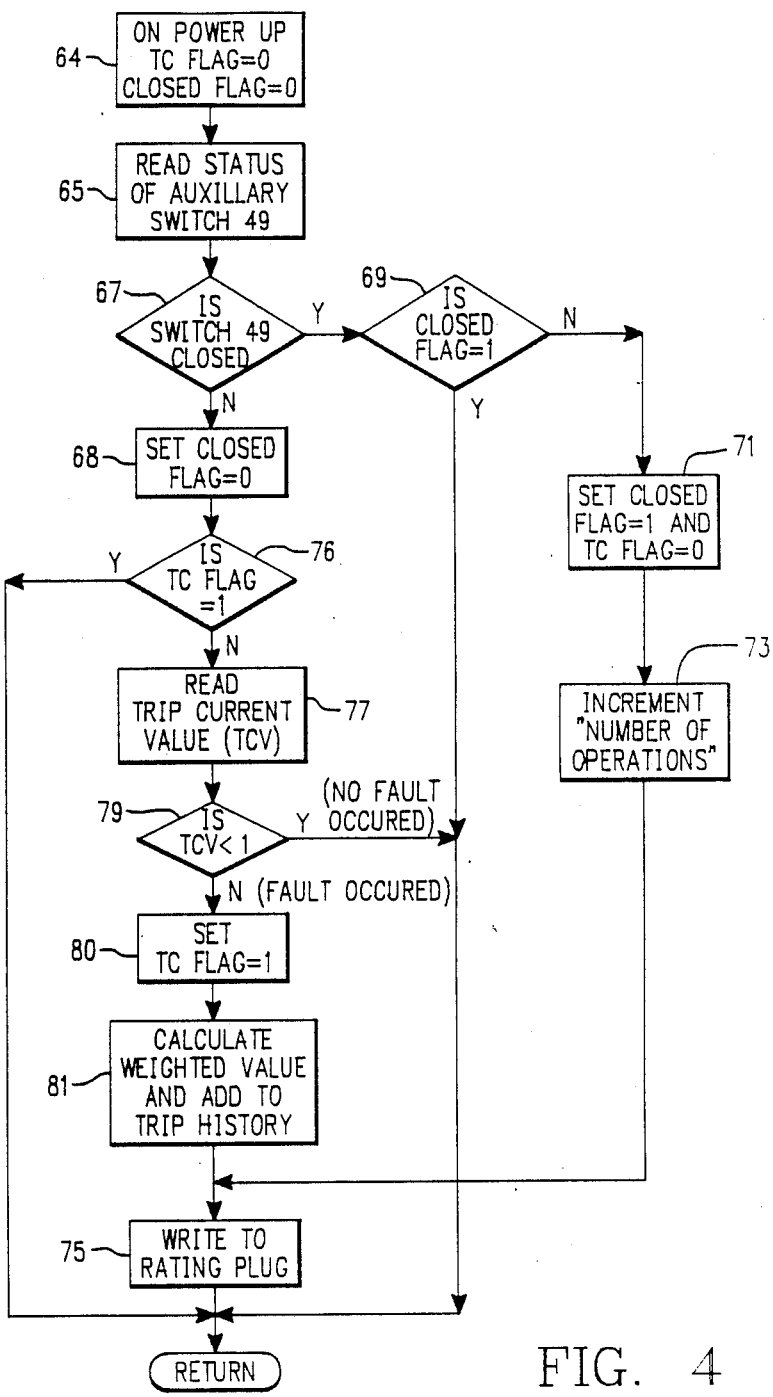
FIG. 4 is a flow chart of a suitable program for a microcomputer which forms part of the circuit breaker of FIGS. 1 and 2.

A flow chart for a suitable program for implementation of the invention by the microcomputer based trip unit 27 is shown in FIG. 4. This program is run periodically with the trip routine and other routines performed by the microprocessor based trip unit. On power up, a trip current flag TC and a closed flag are both initialized to zero at 64. The microcomputer based trip unit then reads the status of the switch 49 at 65. If the switch is closed as determined at 67, a determination is made at 69 as to whether this is a change in status by checking the closed flag. If this is not a change in status, the routine is exited. However, if the switch has closed since the last running of the program, the closed flag is set to 1 and the TC flag is set to zero at 71 and a number of operations counter is incremented at 73. This change in the number of operations of the operating mechanism is then written to the EEPROM in the rating plug at 75 before the program is exited.

If the switch 49 is not closed when checked at 67, indicating that the breaker 31 has tripped, the closed flag is set equal to zero at 68. If the TC flag is not set equal to 1 at 76 indicating that this is the first running of the routine since the breaker opened, the trip current value (TCV) is checked at 77. If the trip current value is less than the maximum continuous current as determined at 79, then no fault has occurred and the program is exited. However, if the maximum continuous current has been exceeded, the TC flag is set equal to 1 at 80 and a weighted value based upon the magnitude of the trip current is calculated and added to a trip history count at 81. The weighted values may be stored in a table or calculated in accordance with a formula suitable for the particular circuit breaker application. This new operating history count is then written to the analog plug at 75 before the routine is exited.

In this manner, service data relevant to the number of mechanical operations of the circuit breaker and the trip history based upon the magnitude of currents interrupted is continually generated and stored in the EEPROM 55 in the removable rating plug 7.

Figure 5:
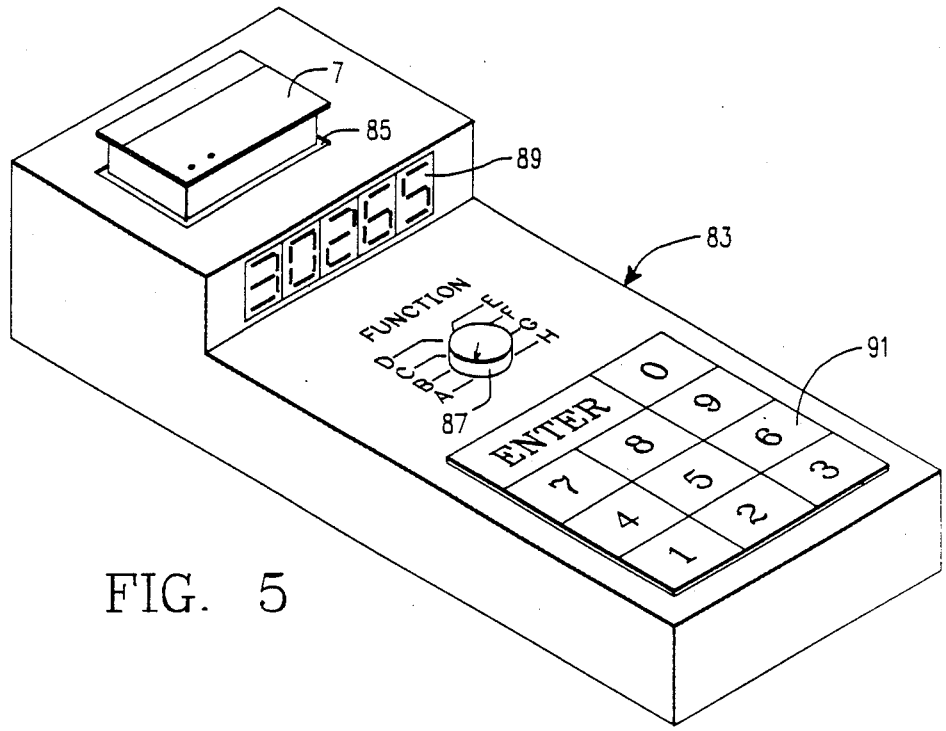
FIG. 5 is an isometric view of a portable programmer used to read and program a rating plug which forms part of the circuit breaker of FIGS. 1 and 2.

When desired, the rating plug 7 may be removed from the trip unit 5 of the circuit breaker and plugged into a reader such as the portable programmer device 83 shown in FIG. 5. The programmer 83 includes a receptacle 85 into which the rating plug 7 is inserted. The programmer 83 performs several functions. It reads the style number, serial number, number of operations and trip history from the EEPROM 55 in the rating plug 7, writes the style number and serial number into the EEPROM, and after recording of the number of operations and trip history, clears those registers. The exemplary programmer is hard wired to perform these functions by use of a selector switch 87. The data in the respective registers of the EEPROM are displayed on a digital display 89. The digits for the style number and serial number are typed in and entered by use of a keypad 91.

Figure 6:
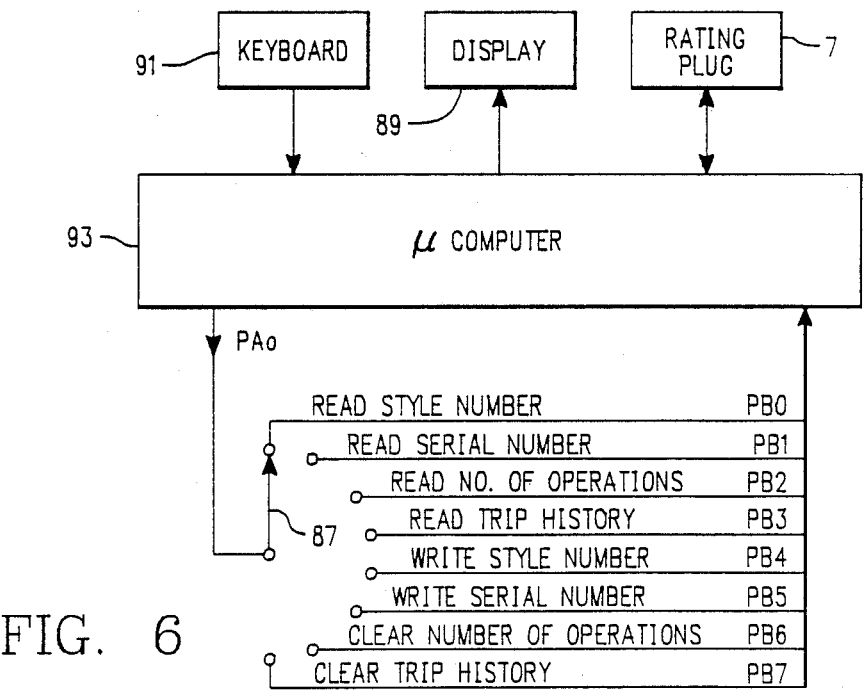
FIG. 6 is a schematic diagram of the programming of the portable programmer of FIG. 5.

As shown in FIG. 6, the programmer includes a microcomputer 93 which as shown schematically, is programmed to perform the read and write functions selected by the selector 87. The data in the various registers in the rating plug 7 are displayed on the display 89 and the style number and serial number are entered in response to data entered through the keyboard 91.

When a new plug is being prepared for a circuit breaker, it is first inserted into the receptacle 85 in the programmer 83 and the style number and serial number of the circuit breaker are entered through the keyboard 91. The rating plug is then removed from the programmer 83, and inserted into the trip unit 5 of the circuit breaker 1. The microcomputer based trip unit 27 of the circuit breaker then periodically enters the number of operations of the circuit breaker and the trip history into the appropriate registers in the EEPROM 55 of the rating plug 7. When desired, a technician can remove the rating plug 7 from the trip unit of the circuit breaker, and plug it into the programmer for reading of the number of operations of the operating mechanism and the trip history.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit breaker for an electrical circuit comprising:
    an operating mechanism for interrupting current in the electrical circuit when operated;
    a trip device including a microprocessor which monitors the current in the electrical circuit and generates a trip by automatically operating the operating mechanism to interrupt the current in the electrical current when the current exceeds a selectable value;
    a removable rating plug having means establishing the selectable value of the current at which the trip device trips the operating mechanism, and a non-volatile memory, said microprocessor in said trip device including means generating service data and writing said service data to the non-volatile memory in the removable rating plug.

2. The circuit breaker of claim 1 wherein said means in said microprocessor generating said service data includes means establishing a trip history of said operating mechanism.

3. The circuit breaker of claim 2 wherein said means establishing a trip history of said operating mechanism comprises means generating a cumulative count of the number of trips weighted by a function of the current interrupted by each trip.

4. The circuit breaker of claim 3 wherein said means generating said service data includes means generating a count of the number of times the operating mechanism is operated.

5. The circuit breaker of claim 1 wherein said means in said microprocessor generating said service data includes means generating an operation count of operations of said operating mechanism.

6. A circuit breaker for an electrical circuit comprising:
an operating mechanism for interrupting current in the electrical circuit when operated;
means generating an operation signal for each operation of the operating mechanism;
a trip device including a microprocessor monitoring the current in the electrical circuit and generating a trip by automatically operating said operating mechanism to interrupt current in the electrical circuit when the current exceeds a selectable value, said microprocessor also generating a count of the operations of said operating mechanism from said operation signal; and
a removable plug having a non-volatile memory, said microprocessor in said trip device writing the count of the operations of the operating mechanism into the nonvolatile memory in the removable plug.

7. The circuit breaker of claim 6 wherein said nonvolatile memory is an erasable electrically programmable read only memory.

8. The circuit breaker of claim 7 wherein said microprocessor also generates a cumulative count of trips weighted by the current interrupted by each trip.

9. In combination:
a circuit breaker for an electrical circuit comprising:
an operating mechanism for interrupting current in the electrical circuit when operated;
a trip device including a microcomputer which monitors the current in the electrical circuit and generates a trip by automatically operating the operating mechanism to interrupt the current in the electrical circuit when the current exceeds a selectable value; and
a removable plug selectably connectable with the trip device and having a non-volatile memory, said microcomputer in said trip device including means generating service data on the operating mechanism and writing said service data in the non-volatile memory in the removable plug; and
a programmer device to which said removable plug when removed from said circuit breaker is alternately connected, said programmer device having means presenting the service data written into the non-volatile memory by said microcomputer in the trip device.

10. The combination of claim 9 wherein the nonvolatile memory in the removable plug includes means storing an identification of the circuit beaker to which the removable plug is selectively connected and said programmer device includes means presenting said identification stored in the non-volatile memory in the removable plug when the removable plug is connected to said programmer device.

11. The combination of claim 10 wherein said monitor device includes means for setting in the nonvolatile memory of the removable plug said identification of the circuit breaker when the removable plug is selectively connected to the programmer device.

12. The combination of claim 10 wherein said means in said microcomputer in the trip device generating said service data includes means generating a cumulative count of the trips weighted by a function of the current interrupted and writing said cumulative count into said non-volatile memory in the removable plug, and wherein said programmer device includes means selectively presenting said cumulative count from said non-volatile memory when said removable plug is connected to said programmer device.

13. The combination of claim 12 wherein said means in said microcomputer in the trip device, generating said service data includes means generating an operations count of the number of operations of said operating mechanism and writing said operations count into said non-volatile memory and wherein said programmer device includes means presenting said said count of the number of operations of said operating mechanism stored in said nonvolatile memory when said removable plug is connected to said programmer device.

14. The combination of claim 13 wherein said nonvolatile memory in said removable plug is an erasible electrically programmable read only memory.

15. The combination of claim 10 wherein said means in said microcomputer in the trip device generating said service data includes means generating an operations count of the number of operations of said operating mechanism and writing said operations count into said non-volatile memory and wherein said programmer device includes means presenting said said count of the number of operations of said operating mechanism stored in said nonvolatile memory when said removable plug is connected to said programmer device.

* * * * *